(12) United States Patent
Song et al.

(10) Patent No.: US 9,119,047 B2
(45) Date of Patent: Aug. 25, 2015

(54) METHOD FOR TRANSMITTING DUAL TONE MULTI FREQUENCY AND ELECTRONIC DEVICE THEREOF

(71) Applicant: Samsung Electronics Co., Ltd., Gyeonggi-do (KR)

(72) Inventors: Ga-Jin Song, Gyeonggi-do (KR); Yu-Jeong Jeon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 20 days.

(21) Appl. No.: 14/052,595

(22) Filed: Oct. 11, 2013

(65) Prior Publication Data
US 2014/0171040 A1 Jun. 19, 2014

(30) Foreign Application Priority Data
Dec. 18, 2012 (KR) ........................ 10-2012-0148917

(51) Int. Cl.
*H04W 4/16* (2009.01)
*H04W 4/12* (2009.01)
*H04W 4/18* (2009.01)

(52) U.S. Cl.
CPC ........................ *H04W 4/16* (2013.01)

(58) Field of Classification Search
USPC .......... 455/63.2, 404.1, 404.2, 433, 445, 518, 455/414.1, 557, 556.1, 410, 575.1, 406, 455/413, 415, 418, 466, 412.1, 408, 416, 455/423, 456.2, 411, 419, 420, 432.3, 407, 455/412.2, 426.1, 432.2, 435.1, 450, 453, 455/456.1, 456.4, 461, 462, 463, 517, 455/550.1, 554.1, 555, 561, 563, 566; 370/310, 352, 260, 401, 336, 353, 356, 370/89, 428; 379/88.18, 67.1, 357.04, 38, 379/88.26, 100.11, 201.03, 207.03, 211.02, 379/257, 88.15, 265.09, 201.01, 265.01, 379/266.01, 266.07, 309, 202.01, 211.01, 379/88.01, 88.22, 114.03; 704/225
See application file for complete search history.

(56) References Cited

U.S. PATENT DOCUMENTS

| 5,734,978 A * | 3/1998 | Hayatake et al. ............. 455/410 |
| 5,764,731 A * | 6/1998 | Yablon ....................... 379/88.15 |
| 6,735,457 B1 * | 5/2004 | Link et al. .................. 455/575.1 |
| 7,729,685 B1 * | 6/2010 | Chen et al. .................... 455/406 |
| 2007/0253545 A1 * | 11/2007 | Chatterjee ................ 379/211.02 |
| 2009/0296608 A1 * | 12/2009 | Khan et al. ..................... 370/260 |

FOREIGN PATENT DOCUMENTS

| KR | 10-2003-0096647 | 12/2003 |
| KR | 10-2005-0104617 | 11/2005 |
| KR | 10-2006-0129760 | 12/2006 |

* cited by examiner

*Primary Examiner* — Inder Mehra

(57) ABSTRACT

A method for transmitting a dual tone multi frequency (DTMF) and an electronic device thereof. In the method, a number input event is detected during communication. When the number input event is detected, a numerical keypad is displayed. At least one number is received via the numerical keypad. The received at least one number is stored in a buffer. When a transmission event is detected, at least one DTMF corresponding to the number stored in the buffer is transmitted to a base station.

18 Claims, 10 Drawing Sheets

METHOD FOR TRANSMITTING DUAL TONE MULTI FREQUENCY AND ELECTRONIC DEVICE THEREOF

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Dec. 18, 2012 and assigned Serial No. 10-2012-0148917, the entire disclosure of which is hereby incorporated by reference.

TECHNICAL FIELD

The present disclosure relates to an electronic device. More particularly, the present disclosure relates to a method and an apparatus for transmitting a multi frequency in an electronic device.

BACKGROUND

Recently, as an electronic device such as a smart phone and a tablet Personal Computer (PC) develops rapidly, an electronic device that enables wireless voice communication and information exchange has become a daily necessity. In an early stage of distribution, the electronic device has been simply recognized as a portable device that enables wireless communication, but as a technology thereof develops and a wireless Internet is introduced, the electronic device gets out of the portable device enabling simple wireless communication and evolves into a multimedia device performing functions of schedule management, games, a remote controller, image shooting, a projector etc., meeting a user's need.

Particularly, recently, as a case of performing a personal business or payment via an electronic device frequency occurs, a circumstance where a user should input numbers during communication occurs. For example, a circumstance where a user needs to input a registration number and a phone number in order to identify the user during communication, or a circumstance where a user needs to input an account number in order to perform payment during communication may occur. In the case where a user performs payment via an electronic device, the user should input numbers corresponding to an account number one by one. However, in case of inputting a plurality of numbers such as an account number, the user may erroneously input numbers or may forget the sequence of the input numbers.

As described above, in the case where a user should input numbers again during communication as in the case where the user has erroneously input numbers during communication or the user has forgotten the sequence of the numbers during communication, the user has an inconvenience of having to return to a previous step and re-perform the proceeding steps, or input the numbers again from the beginning after an input time expires.

SUMMARY

To address the above-discussed deficiencies of the prior art, it is a primary object to provide a method and an apparatus for inputting numbers during communication in an electronic device.

Another aspect of the present disclosure is to provide a method and an apparatus for temporarily storing numbers input during communication in a buffer instead of immediately transmitting the input numbers, and when a transmission event occurs, transmitting the numbers stored in the buffer in an electronic device.

Still another aspect of the present disclosure is to provide a method and an apparatus for temporarily storing numbers input during communication in a buffer instead of immediately transmitting the input numbers, and when a number input cancel event occurs, transmitting the rest of numbers excluding numbers for which a number input cancel event has occurred among the numbers stored in the buffer in an electronic device.

In accordance with an aspect of the present disclosure, a method for transmitting a dual tone multi frequency (DTMF) in an electronic device is provided. The method includes detecting a number input event during communication, when the number input event is detected, displaying a numerical keypad, receiving at least one number via the numerical keypad, storing the received at least one number in a buffer, and when a transmission event is detected, transmitting at least one DTMF corresponding to the number stored in the buffer to a base station.

In accordance with another aspect of the present disclosure, an apparatus for transmitting a dual tone multi frequency (DTMF) in an electronic device is provided. The apparatus includes one or more processors, a touch detect display, at least one sensor, a memory, and one or more programs stored in the memory and configured for execution by the one or more processors, wherein the program includes instructions for detecting a number input event during communication, when the number input event is detected, displaying a numerical keypad, receiving at least one number via the numerical keypad, storing the received at least one number in a buffer, and when a transmission event is detected, transmitting at least one DTMF corresponding to the number stored in the buffer to a base station.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents.

In the description below, the electronic device includes a mobile communication terminal, a smart phone, a tablet PC, and a feature phone having a communication function.

Figure 1A:
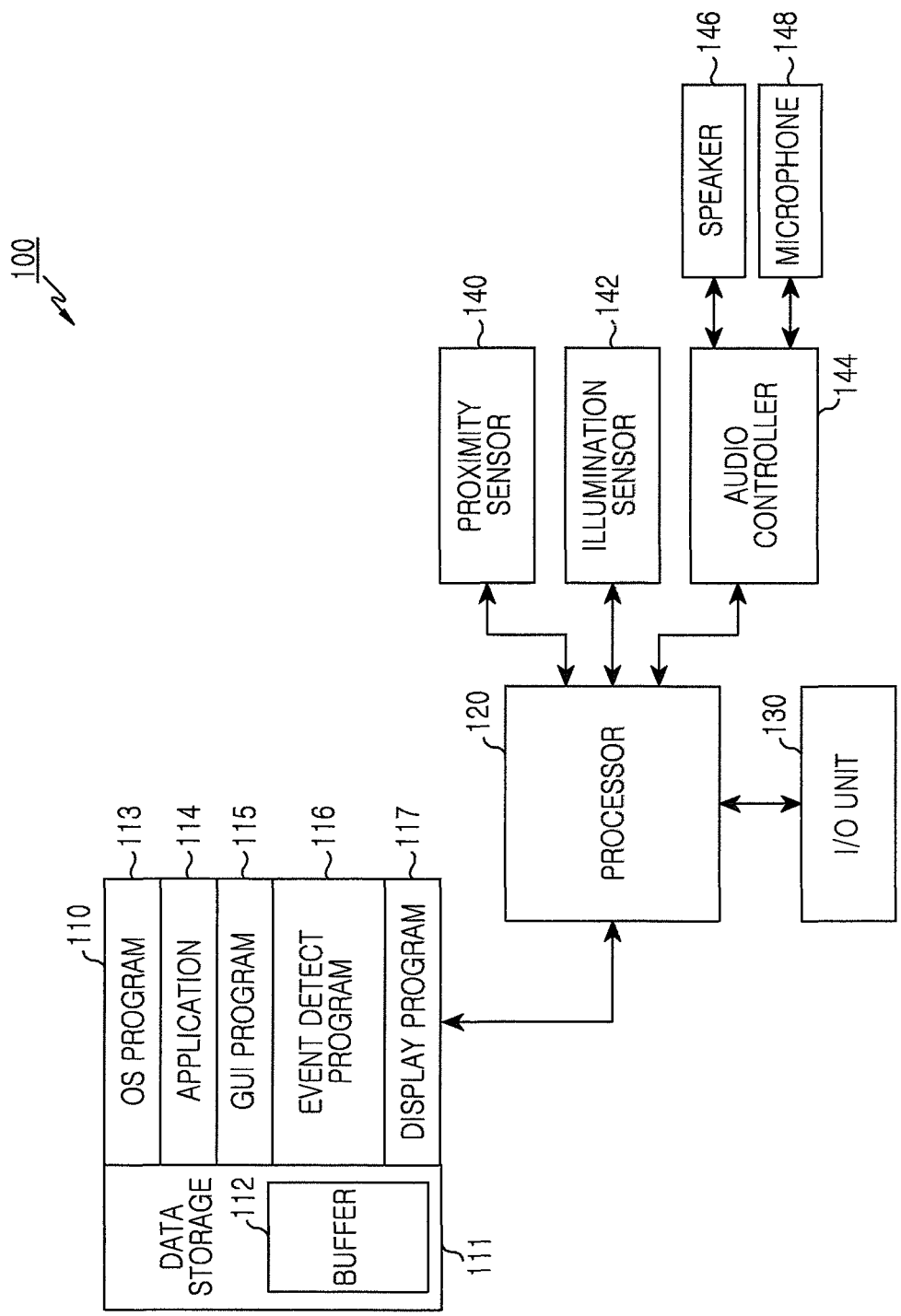
FIG. 1A illustrates a block diagram of an electronic device according to an embodiment of the present disclosure.

FIG. 1A illustrates a block diagram of an electronic device according to an embodiment of the present disclosure.

Referring to FIG. 1A, the electronic device 100 includes a memory 110, a processor 120, an input/output (I/O) unit 130, a proximity sensor 140, an illumination sensor 142, and an audio controller 144. A plurality of memories 110 and processors 120 may exist.

The memory 110 includes a data storage 111, an Operating System (OS) program 113, an application 114, a Graphic User Interface (GUI) program 115, an event detect program 116, and a display program 117. Also, since a program which is a software element may be expressed as a set of instructions, the program may be expressed as an instruction set. A program may be also expressed as a module.

The memory 110 may store one or more programs including instructions performing an embodiment of the present disclosure.

The data storage 111 stores data occurring while a function corresponding to a program stored in the memory 110 is performed. The data storage 111 includes a buffer 112.

The data storage 111 according to the present disclosure stores a voice instruction for determining a circumstance that requires number input during communication. For example, the data storage 111 may store a voice instruction such as "press numbers" or "input numbers". Here, the voice instruction for determining a circumstance requiring number input during communication may be set and changed by a designer and/or a user.

The buffer 112 according to the present disclosure may temporarily store a number received (or input) from a user during communication. At this point, in the case where a number is temporarily stored in the buffer 112 and a predetermined time elapses, the electronic device 100 may transmit a DTMF corresponding to the number stored in the buffer 112 to a base station under control of the event detect program 116 or the processor 112. In addition, in the case where a number is temporarily stored in the buffer 112 and a transmission event occurs, the electronic device 100 may transmit a DTMF corresponding to the number temporarily stored in the buffer 112 to a base station under control of the event detect program 116 or the processor 112.

The OS program 113 (for example, WINDOWS, LINUX, Darwin, RTXC, UNIX, OS X, or a built-in OS such as VxWorks) includes various software elements for controlling a general system operation. For example, control of the general system operation denotes memory management and control, storage hardware (device) control and management, power control and management, etc. The OS program 113 performs a function for swift communication between various hardware (devices) and software elements (programs).

The application 114 includes applications such as a browser, an e-mail, a message, word processing, an address book, a widget, Digital Right Management (DRM), voice recognition, voice duplication, a position determining function, a location based service, communication, etc.

The GUI program 115 includes at least one software element for providing a user interface using graphics between a user and the electronic device 100. That is, the GUI program 115 includes at least one software element for displaying user interface information on the front side of the I/O unit 130. According to the present disclosure, the GUI program 115 includes an instruction for displaying a keypad when a number input event is detected during communication. In addition, the GUI program 115 may include an instruction for displaying a transmit button (or icon) and/or a cancel button (or icon) on an arbitrary region of a display screen where the numerical keypad is displayed when displaying the numerical keypad. Also, the GUI program 115 includes an instruction for displaying a number received via the keypad and a number temporarily stored in the buffer 112 and corresponding to a DTMF transmitted to a base station when a number is input.

The event detect program 116 may detect occurrence of a number input event. At this point, the number input event may be detected via a voice instruction or whether the electronic device 100 approaches.

First, the event detect program 116 may receive the same voice instruction as a voice instruction stored in advance during communication to detect a number input event occurs. In detail, the event detect program 116 receives a voice instruction from a microphone 148 or a counterpart electronic device, and compares the received voice instruction with the voice instruction stored in advance to determine whether the received voice instruction is the same as the voice instruction stored in advance. At this point, the voice instruction stored in advance denotes a voice instruction representing a number input circumstance during communication. For example, the number input circumstance denotes a circumstance under which a user should input a phone number, a registration number, a password, and an account number to an electronic device. At this point, the voice instruction stored in advance may be a number input request instruction such as "press numbers" or "input numbers".

In the case where a received voice instruction is the same as the voice instruction stored in advance, the event detect program 116 may determine a circumstance where a user should input numbers during communication has occurred and control the display program 117 to display the numerical keypad. For example, in the case where a voice instruction saying "input an account number" is received, the event detect program 116 may determine a circumstance where a user should input numbers during communication has occurred and control the display program 117 to display the numerical keypad. For another example, in the case where a voice instruction saying "input registration numbers" is received, the event detect program 117 may determine a circumstance where a user should input numbers during communication has occurred and control the display program 117 to display the numerical keypad.

Additionally, in the case where a received voice instruction is the same as the voice instruction stored in advance, the event detect program 116 may detect whether the electronic device 100 is separated far away from a user's ears. In detail, in the case where the received voice instruction is the same as the voice instruction stored in advance, the event detect program 116 may detect the electronic device 100 is separated far away from the user's ears to determine a circumstance where the user should input numbers during communication has occurred, and control the display program 117 to display the numerical keypad. At this point, the event detect program 116 may detect whether the electronic device 100 is separated far away from the user's ears based on data detected by at least one sensor. For example, the event detect program 116 may determine whether the user's ears are separated far away from the electronic device 100 via the proximity sensor 140 in the neighborhood of the display panel. For another example, the event detect program 116 may determine whether the user's ears are separated far away from the electronic device 100 via the illumination sensor 142 in the neighborhood of the display panel. For still another example, the event detect program 116 may determine whether the user's ears are separated far away from the electronic device 100 via an infrared sensor (not shown) in the neighborhood of the display panel.

In addition, the event detect program 116 may detect occurrence of a transmission event. At this point, the event detect program 116 may detect occurrence of a transmission event based on an elapsed time after a number is input, whether a transmit button is input, or the electronic device 100 approaches.

First, in the case where a predetermined time elapses from a number input point after the number is input, the event detect program 116 may transmit a DTMF corresponding to a relevant number stored in the buffer 112 to a base station. At this point, in the case where two or more numbers are stored in the buffer 112, the event detect program 116 may transmit a DTMF corresponding to a number first stored among the two or more numbers to the base station.

Also, in the case where a transmit button (or icon) is input (or selected) after at least one number is input, the event detect program 116 may transmit a DTMF corresponding to the relevant number stored in the buffer 112 to the base station.

In addition, in the case where the electronic device 100 gets close to the user's ears after at least one number is input to the electronic device 100, the event detect program 116 may transmit a DTMF corresponding to the number stored in the buffer 112 to the base station. The event detect program 116 may detect whether the electronic device 100 gets close to the user's ears based on data detected by at least one sensor. For example, the event detect program 116 may determine whether the electronic device 100 gets close to the user's ears via the proximity sensor 140 in the neighborhood of the display panel. For another example, the event detect program 116 may determine whether the electronic device 100 gets close to the user's ears via the illumination sensor 142 in the neighborhood of the display panel. For still another example, the event detect program 116 may determine whether the electronic device 100 gets close to the user's ears via an infrared sensor (not shown) in the neighborhood of the display panel.

Also, in the case where a transmit button (or icon) and/or a cancel button (or icon) displayed on an arbitrary region of the display screen is selected, the event detect program 116 performs a function corresponding to the selected button (or icon).

For example, in the case where the displayed transmit button (or icon) is selected, the event detect program 116 may transmit a DTMF corresponding to the number stored in the buffer 112 to a base station. For another example, in the case where the displayed cancel button (or icon) is selected, the event detect program 116 may delete the number stored in the buffer 112. At this point, in the case where a plurality of numbers are stored in the buffer 112, the event detect program 116 may delete a number input last and stored in the buffer 112 last among the numbers stored in the buffer 112. For another example, in the case where a plurality of numbers are stored in the buffer 112, the event detect program 116 may delete a number representing a number positioned in front of a cursor displayed on the display unit among the numbers stored in the buffer 112.

In the case where a number input event is detected by the event detect program 116, the display program 117 may display the transmit button (or icon) and/or the cancel button (or icon) on the arbitrary region of the display screen where the numerical keypad is displayed.

In addition, when inputting numbers, the display program 117 may display a number received via the keypad, and may additionally display a number temporarily stored in the buffer 112 and transmitted to a base station. In addition, in the case where a specific number stored in the buffer 112 is deleted by selection of the cancel button, the display program 117 may display an effect of deleting the relevant number displayed on the screen. In addition, in the case where the cancel button has been selected but all the numbers stored in the buffer 112 have been transmitted, the display program 117 may display a message or a graphic effect representing all the input numbers have been transmitted and so the input cannot be cancelled.

Though not shown, the processor 120 may include at least one processor and a peripheral interface. Also, the processor 120 may execute a specific program (instruction set) stored in the memory 110 to perform a plurality of specific functions corresponding to the program.

The I/O unit 130 includes an input unit that can input data and an output unit that can output data to provide an interface to a user. For example, the I/O unit 130 may be a touchscreen that can input and output data simultaneously. When a number input event occurs during communication, the I/O unit 130 according to the present disclosure may display the numerical keypad. In addition, the I/O unit 130 may display the transmit button (or icon) and/or the cancel button (or icon) on the arbitrary region of the display screen where the numerical keypad is displayed.

The proximity sensor 140 may detect whether the user approaches. Particularly, the proximity sensor 140 provided to the neighborhood of the display panel may detect whether the user's ears are separated far way from the electronic device 100 in order to input numbers. At this point, in the case where a distance between the user's ears and the proximity sensor 140 becomes a threshold distance or more, the proximity sensor 140 provided to the neighborhood of the display panel can detect an event where the user's ears are separated far way from the electronic device 100 occurs.

In contrast, the proximity sensor 140 provided to the neighborhood of the display panel can detect whether the electronic device 100 gets close to the user's ears for re-communication after the number input is completed. At this point, in the case where a distance between the user's ears and the proximity sensor 140 gets close within the threshold distance, the proximity sensor 140 provided to the neighborhood of the display panel may detect an event where the user's ears get close to the electronic device 100 occurs.

The illumination sensor 142 may detect whether the user approaches depending on the brightness of detected light. Particularly, the illumination sensor 142 provided to the neighborhood of the display panel may detect whether the user's ears are separated far way from the electronic device 100 in order to input numbers. At this point, in the case where the brightness of light in the neighborhood of the display panel gets brighter more than threshold illumination, the illumination sensor 142 provided to the neighborhood of the display panel may detect an event where the user's ears are separated far way from the electronic device 100 occurs. Also, the illumination sensor 142 provided to the neighborhood of the display panel can detect whether the electronic device 100 gets close to the user's ears for re-communication after the number input is completed. At this point, in the case where the brightness of light in the neighborhood of the display panel gets darker than threshold illumination, the illumination sensor 142 provided to the neighborhood of the display panel may detect an event where the user's ears get close to the electronic device 100 occurs.

The audio controller 144 is coupled to the speaker 146 and the microphone 148 to perform voice recognition, voice duplication, digital recording, and an input/output function of an audio stream such as a telephone function. That is, the audio controller 144 performs a function for outputting an audio signal via the speaker 146 and receiving a user's voice signal via the microphone 148. The audio controller 144 receives a data stream via the processor 120, converts the received data stream to an electric stream, and transfers the converted electric stream (electric signal) to the speaker 146. The audio controller 144 receives a converted electric stream from the microphone 148, converts the received electric stream to an audio data stream, and then transfers the converted audio data stream to the processor 120. The audio controller 144 may include an attachable and detachable ear phone, and a head phone or a head set. The speaker 146 converts an electric stream received from the audio controller 144 to a sound wave audible by a person, and outputs the same. The microphone 148 converts a sound wave transferred from a person or other sound sources to an electric stream. The audio controller 144 according to the present disclosure may receive a voice instruction.

Figure 1B:
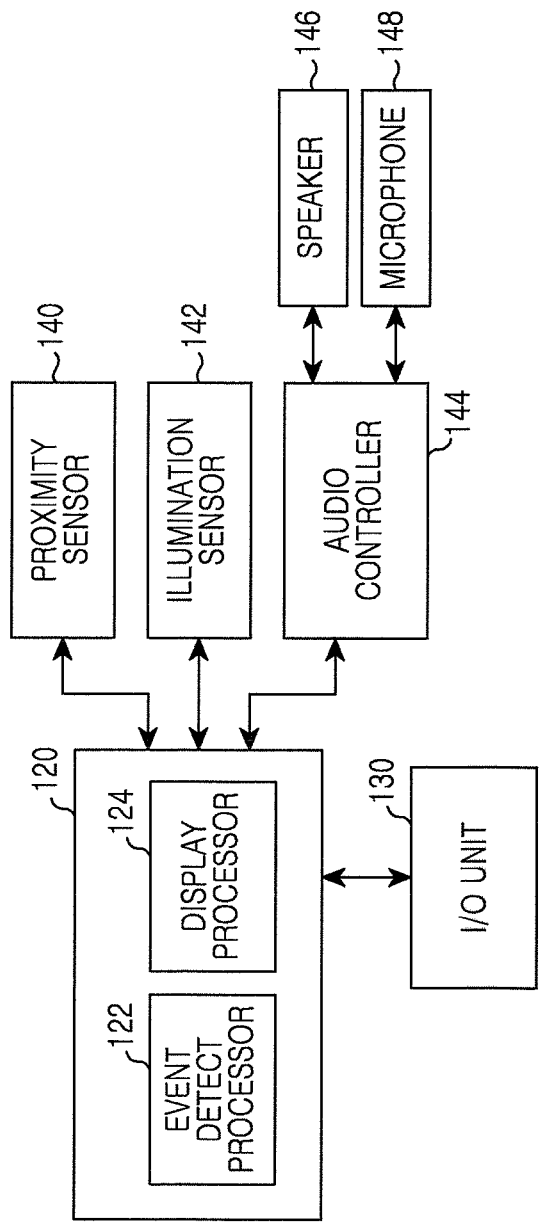
FIG. 1B illustrates a block diagram of a processor according to an embodiment of the present disclosure.

FIG. 1B illustrates a block diagram of a processor according to an embodiment of the present disclosure.

Referring to FIG. 1B, the processor includes an event detect processor 122 and a display processor 124.

The event detect processor 122 may detect occurrence of a number input event. At this point, the number input event may be detected via a voice instruction or whether the electronic device 100 approaches.

First, the event detect processor 122 may detect a number input event occurs by receiving the same voice instruction as the voice instruction stored in advance during communication. In detail, the event detect processor 122 receives a voice instruction from the microphone 148 or a counterpart electronic device during communication, and compares the received voice instruction with the voice instruction stored in advance to determine whether the received voice instruction is the same as the voice instruction stored in advance. At this point, the voice instruction stored in advance denotes a voice instruction representing a number input circumstance during communication. For example, the number input circumstance denotes a circumstance where a user should input a phone number, a registration number, a password, and an account number. At this point, the voice instruction stored in advance may be a number input request instruction such as "press numbers" or "input numbers".

In the case where the received voice instruction is the same as the voice instruction stored in advance, the event detect processor 122 may determine a circumstance where a user should input numbers during communication, and control the display processor 124 to display the numerical keypad. For example, in the case where a voice instruction of "input an account number" is received, the event detect processor 122 may determine a circumstance where a user should input numbers during communication has occurred, and control the display processor 124 to display the numerical keypad. For another example, in the case where a voice instruction of "input a registration number" is received, the event detect processor 122 may determine a circumstance where a user should input numbers during communication has occurred, and control the display processor 124 to display the numerical keypad.

Additionally, in the case where a received voice instruction is the same as the voice instruction stored in advance, the event detect processor 122 may detect whether the electronic device 100 is separated far way from a user's ears. In detail, in the case where a received voice instruction is the same as the voice instruction stored in advance, the event detect processor 122 may detect the electronic device 100 is separated far way from the user's ears to determine a circumstance where a user should input numbers during communication has occurred, and control the display processor 124 to display the numerical keypad. At this point, the event detect processor 122 may detect whether the electronic device 100 is separated far way from a user's ears based on data detected by at least one sensor. For example, the event detect processor 122 may determine whether a user's ears are separated far way from the electronic device 100 via the proximity sensor 140 in the neighborhood of the display panel. For another example, the event detect processor 122 may determine whether a user's ears are separated far way from the electronic device 100 via the illumination sensor 142 in the neighborhood of the display panel. For still another example, the event detect processor 122 may determine whether a user's ears are separated far way from the electronic device 100 via an infrared sensor (not shown) in the neighborhood of the display panel.

In addition, the event detect processor 122 may detect occurrence of a transmission event. At this point, the event detect processor 122 may detect occurrence of a transmission event based on an elapsed time after a number input, whether a transmit button is input, or whether the electronic device 100 approaches.

First, in the case where after a number is input, a predetermined time elapses from the number input point, the event detect processor 122 may transmit a DTMF corresponding to a relevant number stored in the buffer 112 to a base station. At this point, in the case where at least two numbers are stored in the buffer 112, the event detect processor 122 may transmit first a DTMF corresponding to a number stored first among the at least two numbers to a base station.

Also, in the case where after at least one number is input, the transmit button (or icon) is input (or selected), the event detect processor 122 may transmit a DTMF corresponding to the relevant number stored in the buffer 112 to a base station.

In addition, in the case where after at least one number is input to the electronic device 100, the electronic device 100 gets close to a user's ears, the event detect processor 122 may transmit a DTMF corresponding to a number stored in the buffer 112 to the base station. The event detect processor 122 may detect whether the electronic device 100 gets close to the user's ears based on data detected by at least one sensor. For example, the event detect processor 122 may determine whether the electronic device 100 gets close to the user's ears via the proximity sensor 140 in the neighborhood of the display panel. For another example, the event detect processor 122 may determine whether the electronic device 100 gets close to the user's ears via the illumination sensor 142 in the neighborhood of the display panel. For still another example, the event detect processor 122 may determine whether the electronic device 100 gets close to the user's ears via an infrared sensor (not shown) in the neighborhood of the display panel.

Also, in the case where the transmit button (or icon) and/or the cancel button (or icon) displayed on an arbitrary region of the display screen is selected, the event detect processor 122 performs a function corresponding to the selected button (or icon).

For example, in the case where the displayed transmit button (or icon) is selected, the event detect processor 122 may transmit a DTMF corresponding to the number stored in the buffer 112 to the base station. For another example, in the case where the displayed cancel button (or icon) is selected, the event detect processor 122 may delete a number stored in the buffer 112. At this point, in the case where a plurality of numbers are stored in the buffer 112, the event detect processor 122 may delete a number input last and stored in the buffer 112 last. For another example, in the case where a plurality of numbers are stored in the buffer 112, the event detect processor 122 may delete a number representing a number positioned in front of a cursor displayed on the display unit among the numbers stored in the buffer 112.

In the case where a number input event is detected by the event detect processor 122, the display processor 124 may display the transmit button (or icon) and/or the cancel button (or icon) on an arbitrary region of the display screen where the numerical keypad has been displayed.

In addition, when a number is input, the display processor 124 may display the number received via the keypad. Additionally, the display processor 124 may display a number temporarily stored in the buffer 112 and transmitted to a base station. In addition, in the case where a specific number stored in the buffer 112 is deleted by selection of the cancel button, the display processor 124 may display an effect of deleting the relevant number displayed on the screen. In addition, in the case where the cancel button has been selected but all the numbers stored in the buffer 112 have been transmitted, the display processor 124 may display a message or a graphic effect representing all the input numbers have been transmitted and so the input cannot be cancelled.

Figure 2A:
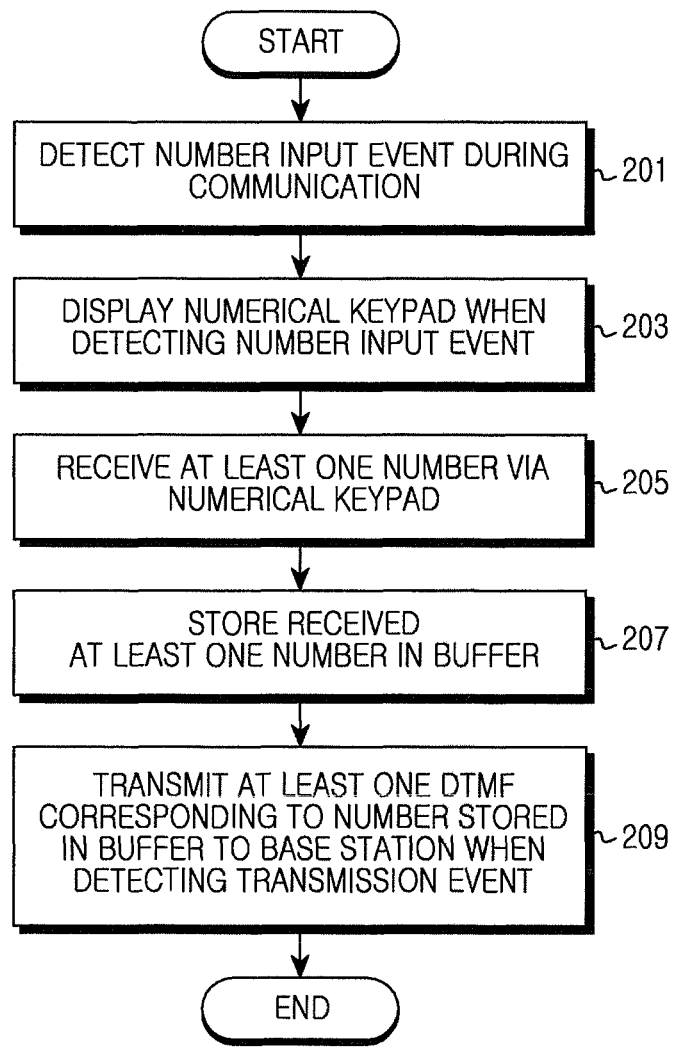
FIG. 2A illustrates a flowchart of a procedure for transmitting a number input during communication in an electronic device according to an embodiment of the present disclosure.

FIG. 2A illustrates a flowchart of a process for transmitting a number input during communication in an electronic device according to an embodiment of the present disclosure.

Referring to FIG. 2A, the electronic device 100 may detect a number input event during communication in step 201. At this point, the electronic device 100 may detect a number input event depending on whether a received voice instruction is the same as the voice instruction stored in advance and/or whether the electronic device 100 is separated far way from a user's ears.

When detecting the number input event in step 203, the electronic device displays a numerical keypad. At this point, the electronic device 100 may display the transmit button (or icon) and/or the cancel button on an arbitrary region of the display screen where the numerical keypad is displayed.

The electronic device 100 receives at least one number via the numerical keypad in step 205, and then proceeds to step 207 to store the received at least one number in the buffer.

After that, when detecting a transmission event, the electronic device may transmit at least one DTMF corresponding to the number stored in the buffer 112 to a base station. At this point, the electronic device may display the number received via the numerical keypad and the number corresponding to the DTMF transmitted from the buffer 112 to the base station. That is, when a number is input via the keypad during the communication, the electronic device 100 may temporarily store the input number in the buffer 112 without immediately transmitting the input number to the base station, and then when detecting a transmission event, may transmit the temporarily stored number to the base station (step 209), and may display the input number and the number transmitted to the base station on the screen in real-time.

Figure 2B:
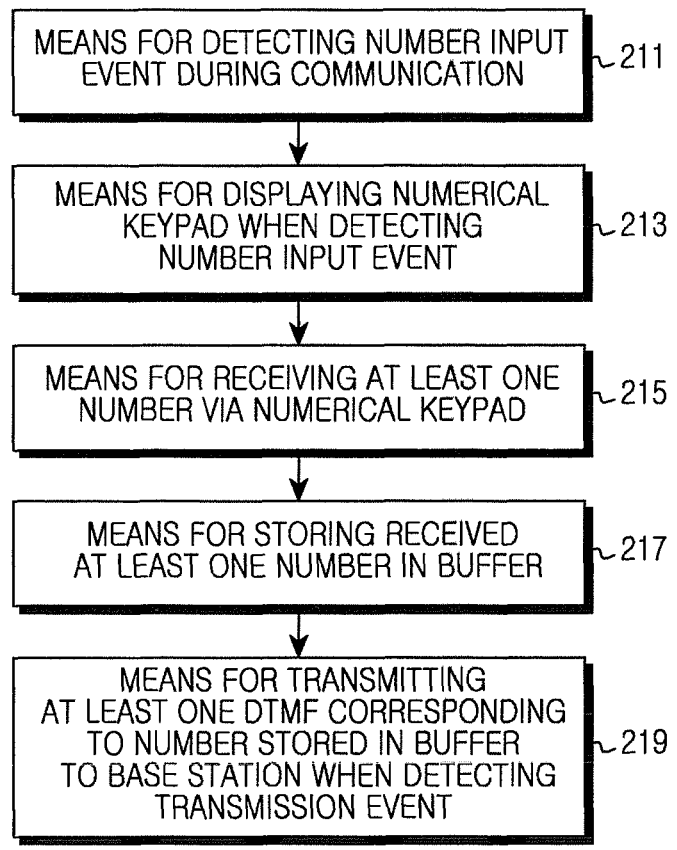
FIG. 2B illustrates means for transmitting a number input during communication in an electronic device according to an embodiment of the present disclosure.

FIG. 2B illustrates means for transmitting a number input during communication in an electronic device according to an embodiment of the present disclosure.

Referring to FIG. 2B, the electronic device 100 includes means 211 for detecting a number input event during communication. At this point, the means 211 for detecting a number input event during communication includes means for detecting reception of a voice instruction coinciding with the voice instruction stored in advance and/or means for detecting whether the electronic device 100 is separated far way from a user's ears.

In addition, the electronic device 100 includes means for displaying the numerical keypad when detecting a number input event. At this point, the electronic device 100 includes means for displaying the transmit button (or icon) and/or the cancel button (or icon) on an arbitrary region of the display screen where the numerical keypad is displayed.

Also, the electronic device 100 includes means 215 for receiving at least one number via the numerical keypad and means 217 for storing the at least one number in the buffer 112. At this point, the electronic device 100 includes means for deleting the number stored in the buffer 112 when the cancel button (or icon) is selected.

In addition, the electronic device 100 includes means 219 for transmitting at least one DTMF corresponding to the number stored in the buffer to a base station when detecting a transmission event. At this point, means for detecting a transmission event includes means for detecting whether a predetermined time elapses after a number is stored in the buffer 112, and means for detecting selection of a transmit button or means for detecting whether the electronic device 100 approaches a user's ears.

Figure 3:
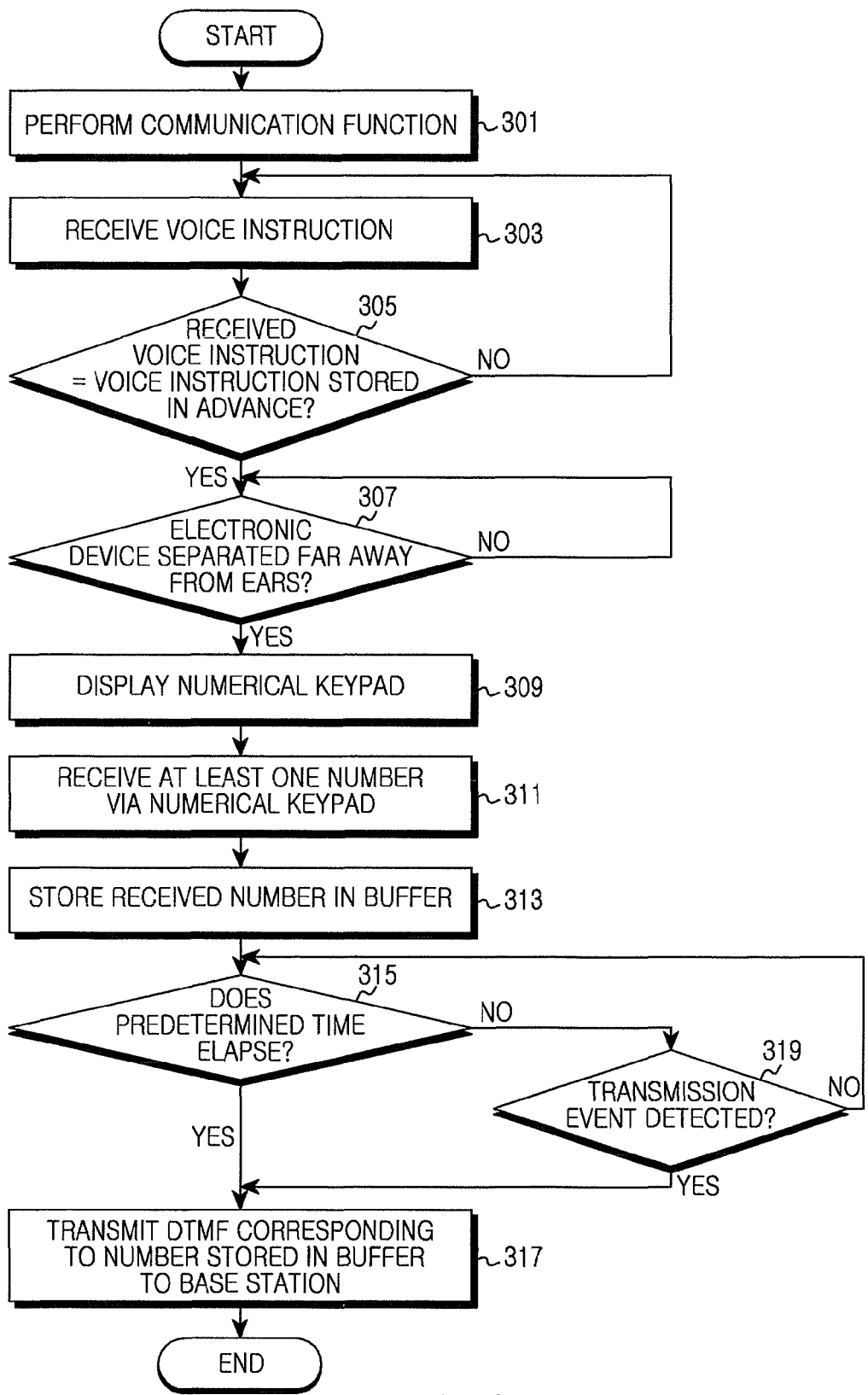
FIG. 3 illustrates is a flowchart of a procedure for temporarily storing a number input during communication in a buffer and then transmitting a DTMF corresponding to the number stored in the buffer to a base station in an electronic device according to an embodiment of the present disclosure.

FIG. 3 illustrates a flowchart of a process for temporarily storing a number input during communication in a buffer and then transmitting a DTMF corresponding to the number stored in the buffer to a base station in an electronic device according to an embodiment of the present disclosure.

Referring to FIG. 3, the electronic device 100 performs a communication function with a counterpart electronic device via a base station in step 301, and proceeds to step 303 to receive a voice instruction. At this point, the voice instruction may be received from the counterpart electronic device in communication or received via the microphone of the electronic device 100.

After that, the electronic device 100 determines whether the received voice instruction is the same as the voice instruction stored in advance in step 305. At this point, the voice instruction stored in advance denotes a voice instruction corresponding to a circumstance where a user should input numbers during communication. For example, the circumstance where the user should input numbers may be a circumstance where the user should input one number or a numeral string such as a phone number, a registration number, a password, and an account number. The voice instruction stored in advance may be an instruction requesting a number input such as "press numbers" or "input numbers".

In the case where the received voice instruction is the same as the voice instruction stored in advance, the electronic device proceeds to step 307 to detect whether the electronic device 100 is separated far way from the user's ears. At this point, the electronic device may detect whether the electronic device 100 is separated far way from the user's ears via sensor data detected by at least one sensor. For example, the electronic device 100 may determine whether the user's ears are separated far way from the electronic device 100 via the proximity sensor 140 in the neighborhood of the display panel. For another example, the electronic device 100 may determine whether the user's ears are separated far way from the electronic device 100 via the illumination sensor 142 in the neighborhood of the display panel. For still another example, the electronic device 100 may determine whether the user's ears are separated far way from the electronic device 100 via an infrared sensor (not shown) in the neighborhood of the display panel.

In the case where the received voice instruction is not the same as the voice instruction stored in advance in step 305, the electronic device 100 returns to step 303 to re-perform subsequent steps.

Figure 4:
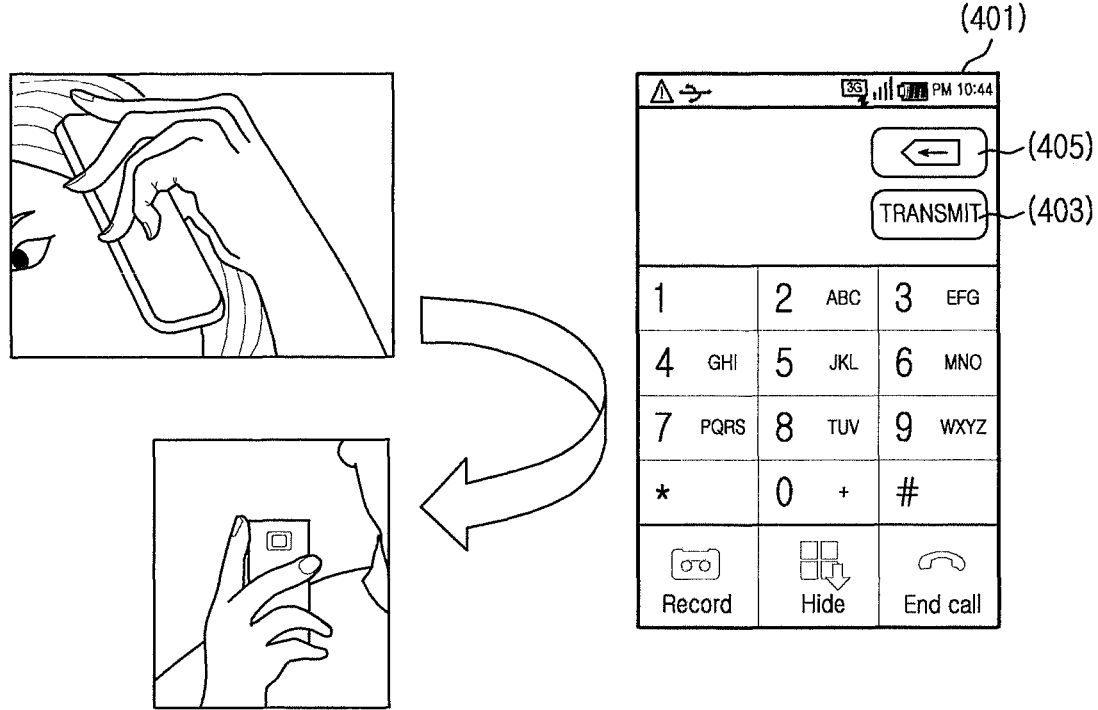
FIG. 4 illustrates an example of displaying a numerical keypad in an electronic device according to an embodiment of the present disclosure.

In the case where the electronic device 100 is separated far way from the user's ears, the electronic device 100 proceeds to step 309 to display a numerical keypad. For example, as illustrated in FIG. 4, in the case where the electronic device 100 is separated far way from the user's ears, the electronic device 100 displays a numerical keypad 401. At this point, the electronic device 100 may display a transmit button 403 and a cancel button 405 on the screen where the numerical keypad 401 is displayed.

In contrast, in the case where the electronic device 100 is not separated far way from the user's ears, the electronic device 100 returns to step 307 to re-perform subsequent steps.

Figure 5:
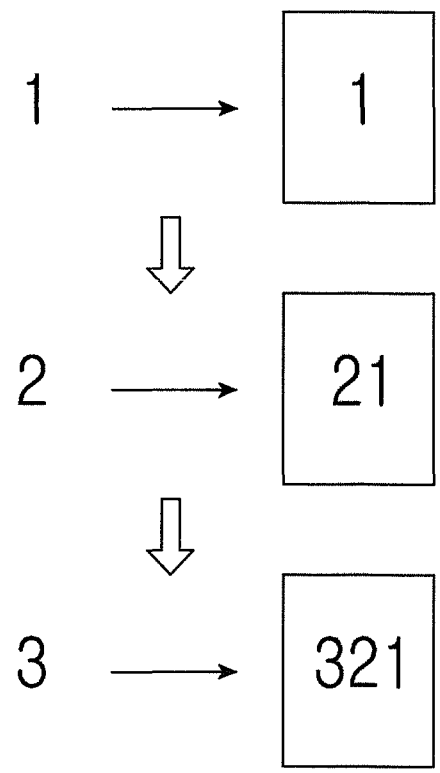
FIG. 5 illustrates an example of storing an input number in a buffer in an electronic device according to an embodiment of the present disclosure.

After that, the electronic device 100 receives at least one number via the numerical keypad in step 311, and proceeds to step 313 to store the received number in the buffer 112 without transmitting the received number. At this point, the electronic device may store numbers in the buffer 112 in a sequence by which numbers have been received. For example, as illustrated in FIG. 5, in the case where 1, 2, 3 are sequentially received via the numerical keypad, the electronic device 100 may store the numbers 1, 2, 3 in the buffer 112 in a received sequence.

After that, the electronic device 100 determines whether a predetermined time has elapsed from a point at which the numbers have been received via the numerical keypad in step 315.

Figure 6:
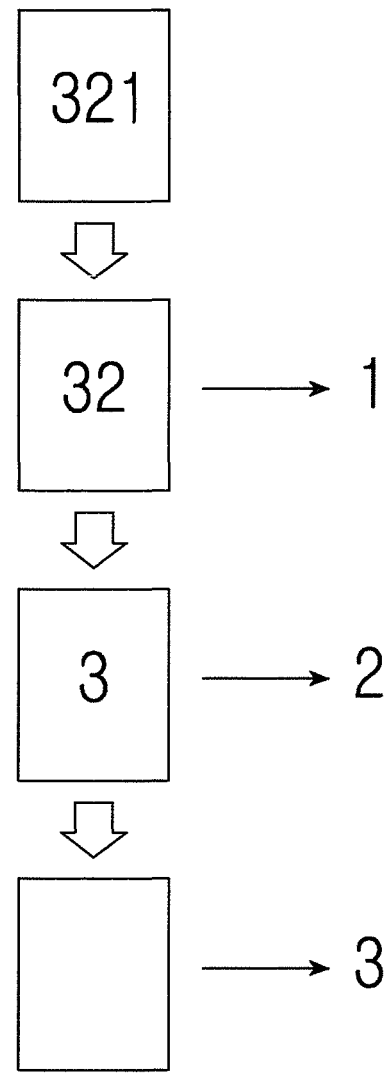
FIG. 6 illustrates an example of transmitting a DTMF corresponding to a number stored in a buffer to a base station in an electronic device according to an embodiment of the present disclosure.

In the case where the predetermined time has elapsed from a point at which the number has been received, the electronic device 100 may proceed to step 317 to transmit a DTMF corresponding to the number stored in the buffer 112 to a base station. At this point, in the case where at least two numbers are stored in the buffer 112, the electronic device 100 may transmit first a DTMF corresponding to a number stored first among the at least two numbers to the base station. For example, as illustrated in FIG. 6, in the case where numbers 1, 2, 3 have been sequentially stored, the electronic device 100 transmits a DTMF corresponding to the number 1 first to the base station, and then transmits a DTMF corresponding to the number 2 to the base station, and transmits a DTMF corresponding to the number 3 to the base station last. At this point, the electronic device may select numbers for which the predetermined time has been elapsed from the input point among the numbers stored in the buffer 112, and transmit DTMFs corresponding to the selected numbers, respectively, to the base station. After that, the electronic device 100 ends the procedure according to an embodiment of the present disclosure.

In contrast, in the case where the predetermined time has not elapsed from the point at which the numbers have been received, the electronic device 100 proceeds to step 319 to determine whether a transmission event occurs. At this point, the electronic device 100 may detect a transmission event via whether the transmit button is selected or whether the electronic device 100 gets close to a user's ears.

Figure 7:
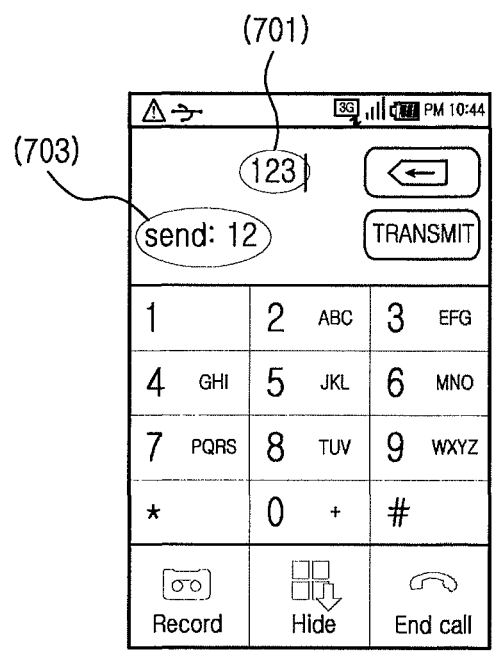
FIG. 7 illustrates an example of displaying a input number and a transmitted number during communication in an electronic device according to an embodiment of the present disclosure.
Figure 8:
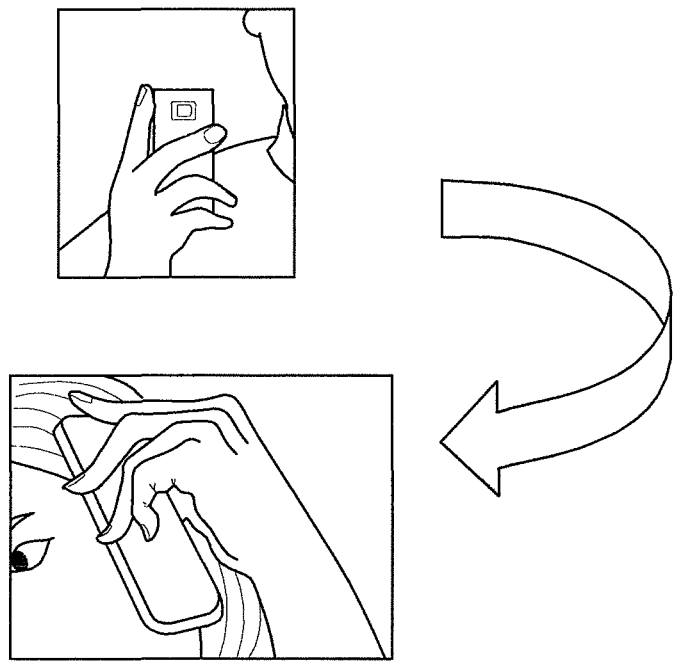
FIG. 8 illustrates an example of automatically transmitting a DTMF corresponding to a number stored in a buffer to a base station in an electronic device according to an embodiment of the present disclosure.

In the case where the transmission event is detected, the electronic device 100 proceeds to step 317 to transmit DTMs corresponding to the numbers stored in the buffer, respectively, to the base station. For example, in the case where selection of the transmit button is detected, the electronic device 100 may transmit a plurality of DTMFs corresponding to the numbers stored in the buffer 112 to the base station. For another example, as illustrated in FIG. 8, when detecting a circumstance where the electronic device 100 gets close to a user's ears, the electronic device 100 may determine the user successfully completes number input and desires to perform a communication function continuously, and transmit a plurality of DTMFs corresponding to the numbers stored in the buffer 112 to the base station. At this point, as illustrated in FIG. 7, the electronic device 100 may detect numbers 701 received via the numerical keypad during communication, and numbers 703 temporarily stored in the buffer 112 and transmitted to the base station among the received number 701 in real-time, and display the same. Additionally, though not shown, in the case where the cancel button is selected under a user control, the electronic device 100 may delete a number that is not transmitted to the base station and temporarily stored in the buffer 112 up to the current point. For example, as illustrated in FIG. 7, in the case where after 1, 2, 3 are sequentially input, 1 and 2 are transmitted to the base station and 3 is temporarily stored in the buffer 112 among the input numbers due to elapse of the predetermined time, when a user selects the cancel button, the electronic device 100 may delete the number 3 temporarily stored in the buffer 112 without transmitting the number 3. After that, the electronic device 100 ends the procedure according to an embodiment of the present disclosure.

In contrast, in the case where the transmission event is not detected, the electronic device returns to step 315 to re-perform subsequent steps.

An embodiment and all functional operations of the disclosure described in the present specification may be implemented by computer software including a structure disclosed in the present specification and equivalents thereof, firmware, or hardware, or a combination of one or more of these. Also, embodiments of the disclosure described in the present specification may be implemented by one or more computer program products, that is, a data processing device, or one or more modules of computer program instructions encoded on a computer readable medium for controlling the operation of this device.

The non-transitory computer readable medium may be a machine readable storage medium, a machine readable storage substrate, a memory device, configuration of a material influencing a machine readable radio wave stream, or a combination of one or more of these. A terminology of the data processing device includes a programmable processor, a computer, or all apparatus, devices, and machines for processing data including a multi processor or computer, for example. The apparatus may include a code for generating an execution environment for a relevant computer program in addition to the hardware, for example, a processor firmware, a protocol stack, a database management system, an operating system or a code forming a combination of one or more of these.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A method for operating an electronic device, the method comprising:
   detecting a number input event during communication;
   in response to detecting the number input event, displaying a numerical keypad;
   receiving at least one number via the numerical keypad;
   storing the at least one number in a buffer;
   in response to a transmission event being detected, transmitting at least one dual tone multi frequency (DTMF) corresponding to the at least one number stored in the buffer to a base station; and
   displaying, in real-time, a number received up to a current point via the numerical keypad and a number whose DTMF is transmitted.

2. The method of claim 1, wherein detecting the number input event during communication comprises:
   detecting whether a voice instruction received during the communication corresponds to a voice instruction stored in advance; and
   in response to the voice instruction received during the communication corresponding to the voice instruction stored in advance, detecting the number input event.

3. The method of claim 2, further comprising:
   in response to the voice instruction received during the communication corresponding to the voice instruction stored in advance, detecting whether a user's ears are separated from the electronic device by a threshold distance via at least one sensor,
   wherein when the user's ears are separated from the electronic device by the threshold distance, the number input event is detected.

4. The method of claim 1, wherein the transmission event is detected when a predetermined time elapses from a point at which the at least one number is received via the numerical keypad.

5. The method of claim 1, wherein the transmission event is detected by selection of a transmit menu.

6. The method of claim 1, wherein the transmission event is detected by determining a circumstance where a user's ears approach the electronic device via at least one sensor.

7. The method of claim 1, further comprising:
   detecting a number input cancel event; and
   in response to detecting the number input cancel event, deleting at least one number not transmitted to the base station and present in the buffer from the buffer to cancel an input.

8. The method of claim 7, wherein canceling the input comprises:
   deleting, from the buffer, a number input last in time via the numerical keypad among numbers not transmitted to the base station and present in the buffer.

9. The method of claim 7, further comprising:
   in response to detecting the number input cancel event, determining whether at least one number not transmitted to the base station is present in the buffer; and
   when no number not transmitted to the base station is present in the buffer, displaying a graphic element representing the input is non-cancelable.

10. An apparatus for transmitting a dual tone multi frequency (DTMF) in an electronic device, the apparatus comprising:
    a touch display;
    a buffer; and
    a processor configured to:
       detect a number input event during communication,
       in response to detecting the number input event, display a numerical keypad,
       receive at least one number via the numerical keypad,
       store the at least one number in the buffer,
       in response to a transmission event being detected, transmit at least one DTMF corresponding to the at least one number stored in the buffer to a base station, and
       display, in real-time, a number received up to a current point via the numerical keypad and a number whose DTMF is transmitted.

11. The apparatus of claim 10, wherein the processor is further configured to:
- detect whether a voice instruction received during the communication corresponds to a voice instruction stored in advance, and
- in response to the voice instruction received during the communication corresponding to the voice instruction stored in advance, detect the number input event.

12. The apparatus of claim 11, wherein the processor is further configured to:
- in response to the voice instruction received during the communication corresponding to the voice instruction stored in advance, detect whether a user's ears are separated from the electronic device by a threshold distance via at least one sensor,
- wherein when the user's ears are separated from the electronic device by the threshold distance, the number input event is detected.

13. The apparatus of claim 10, wherein the transmission event is detected when a predetermined time elapses from a point at which the at least one number is received via the numerical keypad.

14. The apparatus of claim 10, wherein the transmission event is detected by selection of a transmit menu.

15. The apparatus of claim 10, wherein the transmission event is detected by determining a circumstance where a user's ears approach the electronic device via at least one sensor provided.

16. The apparatus of claim 10, wherein the processor is further configured to:
- detect a number input cancel event, and
- in response to detecting the number input cancel event, delete at least one number not transmitted to the base station and present in the buffer from the buffer to cancel an input.

17. The apparatus of claim 16, wherein the processor is further configured to deleting, from the buffer, a number input last in time via the numerical keypad among numbers not transmitted to the base station and present in the buffer.

18. The apparatus of claim 16, wherein the processor is further configured to:
- in response to detecting the number input cancel event, determine whether at least one number not transmitted to the base station and is present in the buffer, and
- when no number not transmitted to the base station is present in the buffer, display a graphic element representing the input is non-cancelable.

* * * * *